(12) United States Patent
Honeycutt

(10) Patent No.: US 8,387,191 B2
(45) Date of Patent: Mar. 5, 2013

(54) GANGWAY BEARING RETAINER PLATE

(75) Inventor: Robert W. Honeycutt, Pawleys Island, SC (US)

(73) Assignee: Safe Rack LLC, Andrews, SC (US)

( * ) Notice: Subject to any disclaimer, the term of this patent is extended or adjusted under 35 U.S.C. 154(b) by 19 days.

(21) Appl. No.: 13/189,010

(22) Filed: Jul. 22, 2011

(65) Prior Publication Data

US 2012/0017383 A1 Jan. 26, 2012

Related U.S. Application Data

(60) Provisional application No. 61/366,612, filed on Jul. 22, 2010.

(51) Int. Cl.
*E01D 1/00* (2006.01)
*E01D 15/08* (2006.01)

(52) U.S. Cl. .......... 14/36; 14/31; 14/37; 14/41; 14/69.5; 182/95; 114/362

(58) Field of Classification Search ................ 14/31, 36, 14/37, 41, 69.5, 71.1; 114/362; 182/95
See application file for complete search history.

(56) References Cited

U.S. PATENT DOCUMENTS

| 3,696,754 A * | 10/1972 | Anderson et al. | 104/162 |
| 4,108,457 A * | 8/1978 | Garrett | 280/166 |
| 5,941,342 A * | 8/1999 | Lee | 182/95 |
| 6,505,708 B2 * | 1/2003 | LaBrash | 182/127 |
| 2010/0175608 A1* | 7/2010 | Heckaman et al. | 114/362 |
| 2013/0000542 A1* | 1/2013 | Muller | 114/362 |

* cited by examiner

*Primary Examiner* — Raymond W Addie
(74) *Attorney, Agent, or Firm* — Nelson Mullins Riley & Scarborough LLP; R. Brian Drozd

(57) ABSTRACT

A bearing retainer plate for fall restraint equipment made from a single, continuous piece of sheet metal, where the metal is lasered, cut, and/or butterflied to define a plurality of apertures. A bearing, preferably possessing a self-centering characteristic, is inserted into one of the apertures, while an adapter or bracket for an over-travel stop is inserted into another. A foot lock stud is inserted into another aperture defined by the bearing retainer plate and welded into place. The piece of metal may also define apertures configured to receive fasteners for attaching the plate to the fall restraint equipment, such as to a support structure of a gangway.

6 Claims, 7 Drawing Sheets

GANGWAY BEARING RETAINER PLATE

CROSS-REFERENCE TO RELATED APPLICATIONS

This application claims the benefit of U.S. patent application No. 61/366,612, entitled "Gangway Bearing Retainer Plate" and filed on Jul. 22, 2010, the entire disclosure of which is hereby incorporated by reference as if set forth verbatim herein and relied upon for all purposes.

FIELD OF THE INVENTION

The present invention relates to fall restraint equipment, and more particularly, to a bearing retainer plate for a gangway.

BACKGROUND OF THE INVENTION

Fall restraint equipment, such as gangways, may comprise platforms, ramps, bridges, steps, guardrails, and other support structures. Gangways may be used to provide access to an area, such as the top of a storage container. For example, a semi-trailer truck or a railroad carriage transporting dry goods may need to be unloaded from the container's top. A gangway is used to provide workers a path to unload the material. The major parts of current gangways are constructed by a process involving cutting and welding a large number of smaller components together. The process requires a relatively substantial amount of time, manpower, and components.

SUMMARY OF THE INVENTION

The present invention recognizes and addresses the foregoing considerations, and others, of prior art construction and methods.

In this regard, one aspect of the present invention provides a method for manufacturing a gangway comprising a support platform and a support structure. The support structure is connected to the support platform in a manner that allows the support structure to rotate with respect to the support platform. The method comprising the steps of cutting a continuous piece of metal to define a plurality of apertures and inserting a bearing into a first of the plurality of apertures. The bearing allows the continuous piece of metal to rotate with respect to the support platform. The method further comprises the step of inserting a bracket for an over-travel stop into a first set of the plurality of apertures. The bracket is configured to receive the over-travel stop. The method further comprises the step of inserting a foot lock stud into a second of the plurality of apertures.

Another aspect of the present invention provides a gangway comprising a support platform, a support structure connected to the support platform in a manner that allows the support structure to rotate with respect to the support platform, a continuous piece of metal connected to the support platform, a bracket configured to receive a stop inserted into at least a first aperture defined by the continuous piece of metal, and a foot lock inserted into a second aperture defined by the continuous piece of metal.

Yet another aspect of the present invention provides a bearing retainer plate for a gangway comprising a single, continuous piece of metal defining first and second apertures. The first aperture is configured to receive an over-travel stop and the second aperture is configured to receive a foot lock stud.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1A:
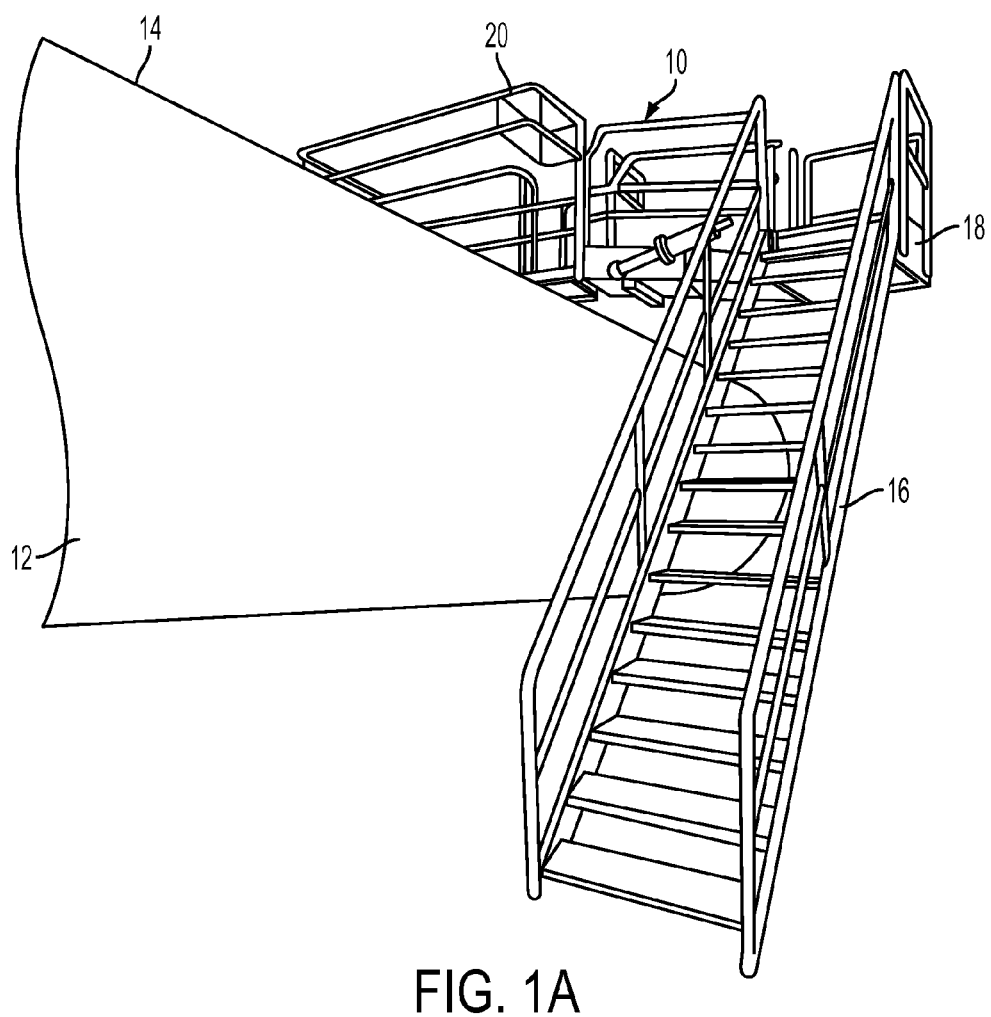
FIG. 1A is a perspective view of fall restraint equipment in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1A illustrates the placement of a gangway 10 to provide access to a storage container 12 from above. Storage container 12 typically contains material, such as particulate matter, to be unloaded from the container's top indicated at 14. A nearby stairwell 16 provides access to platform 18, to which gangway 10 is attached. A user may access top 14 of container 12 via stairwell 16, platform 18, and gangway 10. An optional cage 20 may be attached to gangway 10.

Examples of gangways, their components, and associated fall restraint equipment are set forth in copending U.S. patent application Ser. No. 12/329,883 (entitled "A Gangway and Method of Manufacturing Same" and filed on Dec. 8, 2008), Ser. No. 12/468,704 (entitled "Fall Restraint Equipment Component and Method for Manufacturing the Same" and filed on May 19, 2009), Ser. No. 12/487,408 (entitled "Fall Restraint Equipment Component and Method for Manufacturing the Same" and filed on Jun. 18, 2009), Ser. No. 12/537,842 (entitled "Fall Restraint Equipment Components and Method for Manufacturing the Same" and filed on Aug. 7, 2009), Ser. No. 12/552,811 (entitled "Gangway Handrail and Method for Manufacturing the Same" and filed on Sep. 2, 2009), and Ser. No. 12/837,480 (entitled "Mobile Access Unit and Cage" and filed on Jul. 15, 2010), the entire disclosure of each of which is hereby incorporated by reference as if set forth verbatim herein and relied upon for all purposes.

Figure 1B:
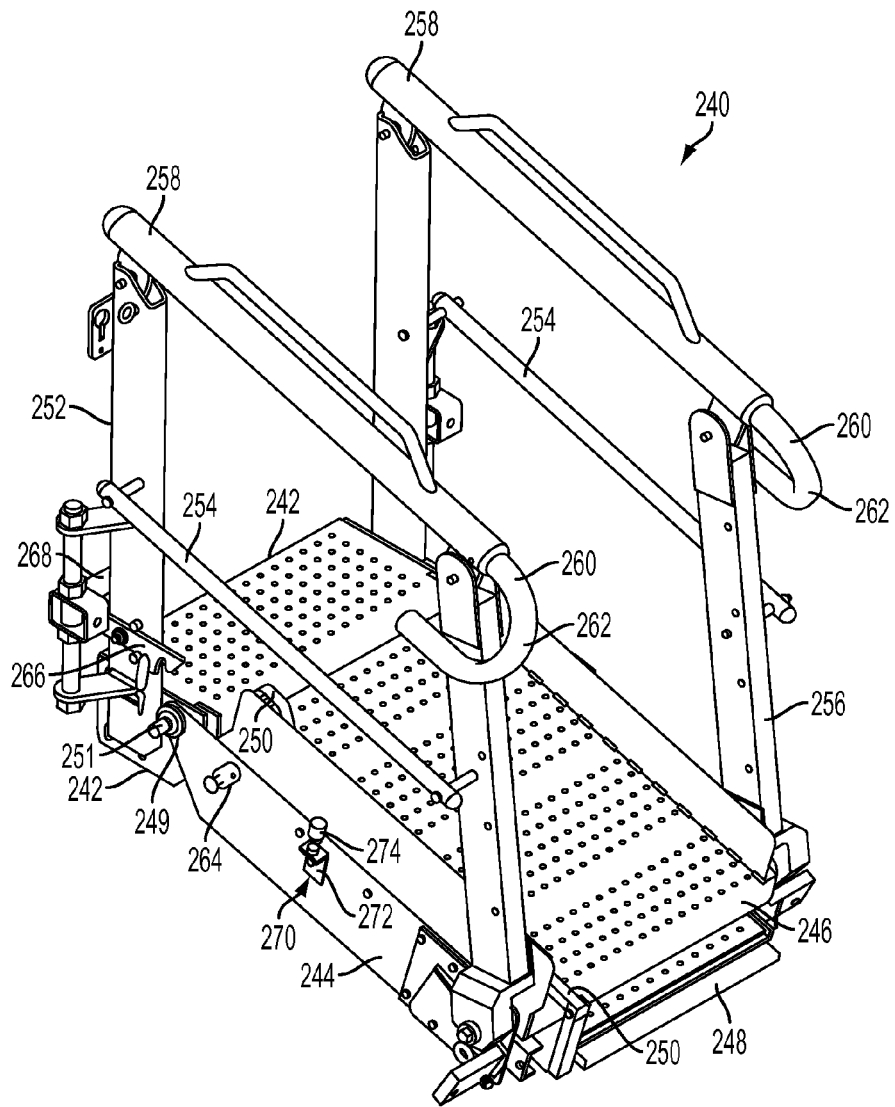
FIG. 1B is a perspective view of a gangway in accordance with an embodiment of the present invention.

FIG. 1B illustrates a gangway 240 in accordance with another embodiment of the present invention. As shown, gangway 240 comprises a support platform 242, a support structure 244, a ramp 246, and a telescoping ramp 248. Ramp 246 is connected to support structure 244, which is pivotally connected to support platform 242 or to another support structure in a manner that allows support structure 244 and ramp 246 to pivotally rotate relative to support platform 242. In this embodiment, for instance, support structure 244 defines an aperture in which a bearing 249 has been inserted. A rod 251 passing through bearing 249 and support structure 244 connects the support structure to support platform 242. As a result, support structure 244 and, thus, ramp portions 246 and 248, may pivot or rotate with respect to support platform 242 about an axis defined by rod 251. Support platform 242 may be connected to a fixed structure, such as platform 18 or stairwell 16 illustrated in FIG. 1A. It should be understood that support structure 244 comprises another bearing similar to bearing 251 located on the side of the support structure opposite the side illustrated. The additional bearing connects the opposite side of support structure 244 to the opposite side of support platform 242. Telescoping ramp 248 is located between ramp 246 and support structure 244 and is configured to slideably extend outward from, and retract underneath, ramp 246. Telescoping ramp 248 may include a rotating arm 250 used to maintain the ramp in a desired position.

Gangway 240 may include several other support components, such as guardrails 252 and 256, midrails 254, and handrails 258, that should be understood by those skilled in the art. Handrails 258 may also include retractable segments 260 capable of retracting within, and extending out from, the handrails. As shown, retractable segments 260 may terminate in hook-shaped configurations 262, which can be attached to the relevant storage container or a structure connected to the relevant storage container in order to provide additional stability to gangway 240 during its use. Additionally, two counterbalanced springs may be connected to guardrails 252 and 256 on each side of gangway 240 or to support structure 244 to facilitate the pivoting of support structure 244 with respect to support platform 242 as should be appreciated by those skilled in the art. Heavy-duty chains may be attached to guardrails 252 and 256 to secure gangway 240 in a specific orientation. The construction and operation of gangway and its components are described in additional detail in U.S. patent application Ser. No. 12/329,883 incorporated by reference herein above.

In the presently-described embodiment, gangway 240 comprises additional components, such as a foot lock stud 264, a foot lock 266, and a pedal 268. Foot lock stud 264 is welded or otherwise connected, such as by a rivet, to support structure 244. Foot lock stud 264 is configured to have a neck portion that is smaller than the portions of the foot lock stud on either sides of the neck portion as illustrated. Foot lock 266 is bolted or otherwise connected, such as by a rod and bearing, to guardrail 252 so that the foot lock may pivot with respect to the guardrail. Pedal 268 is connected to foot lock 266 in a manner such that pressure asserted on the pedal in a downward motion causes the foot lock to raise in an upward motion.

A portion of foot lock 266 furthest from pedal 268 is configured as a slanted hook as illustrated such that pressure applied directly to this portion in a horizontal manner causes the lock to rise in an upward motion due to the hook's slant. When the object applying the pressure to the slanted portion of foot lock 266 reaches the indentation of the slanted hook, the foot lock lowers and locks around the object. For instance, when support structure 244 and ramps 246 and 248 are raised so that the support structure and ramps pivot with respect to support platform 242, foot lock stud 264 comes into contact with, and applies pressure to, the slanted hook portion of foot lock 266. As foot lock stud 264 continues to apply pressure to foot lock 266, the foot lock raises upward until the foot lock stud reaches the indentation/neck portion of the foot lock described above. At this point, foot lock 266 lowers and its hook portion locks around the neck portion of foot lock stud 264. Applying pressure to pedal 268, such as from a user's foot, causes the pedal to lower and foot lock 266 to rise. As a result, foot lock stud 264 is released, and support structure 244 and ramps 246 and 248 may be lowered.

In operation, support structure 244, ramp 246, and telescoping ramp 248 pivot relative to support platform 242 so that gangway 240 may be raised or lowered in order to position the end of ramp 246 adjacent to the relevant container. Telescoping ramp 248 may then be moved so as to extend from ramp 246 to a desired position to span any gap between ramp 246 and the storage container. Rotating arm 250 is then used to secure telescoping ramp 248 to ramp 246 in order to maintain telescoping ramp 248 in a fixed position. For example, rotating arm 250 may have a transverse pin at its distal end which is inserted through aligned traction holes in ramp 246 and telescoping ramp 248. The user may hold telescoping arm 250 as a handle in order to facilitate extension and retraction of telescoping ramp 248. Support structure 244 may be rotated such that the structure and ramps 246 and 248 retract into a generally vertical position, as described above. In a preferred embodiment, counterbalanced springs connected to guardrails 252 and 256 and/or support structure 244 facilitate and assist rotation of the support structure and ramps with respect to support platform 242. When gangway 240 is not in use, support structure 244 and ramps 246 and 248 may be returned to a vertically retracted position and locked into place using foot lock stud 264 and foot lock 266 in the manner described above.

Gangway 240 may comprise additional components, such as an over-travel stop 270 comprising a bracket 272 and a bumper 274. In this embodiment, bracket 272 is comprised of two pieces of metal welded together in an l-shape and is then welded to support structure 244. Bumper 274 is inserted in an aperture defined by one of the two pieces of metal as illustrated. One end of bumper 274 is formed from rubber or other suitable shock-absorbing material. In operation, over-travel stop 270 and, specifically, bumper 274 come into contact with guardrail 252 when gangway 240 and, specifically, support structure 244 and ramps 246 and 248 are retracted into an upright, vertical position in the manner described above. That is, over-travel stop 270 prevents the components of gangway that are not meant to come into contact from colliding with one another.

Figure 2:
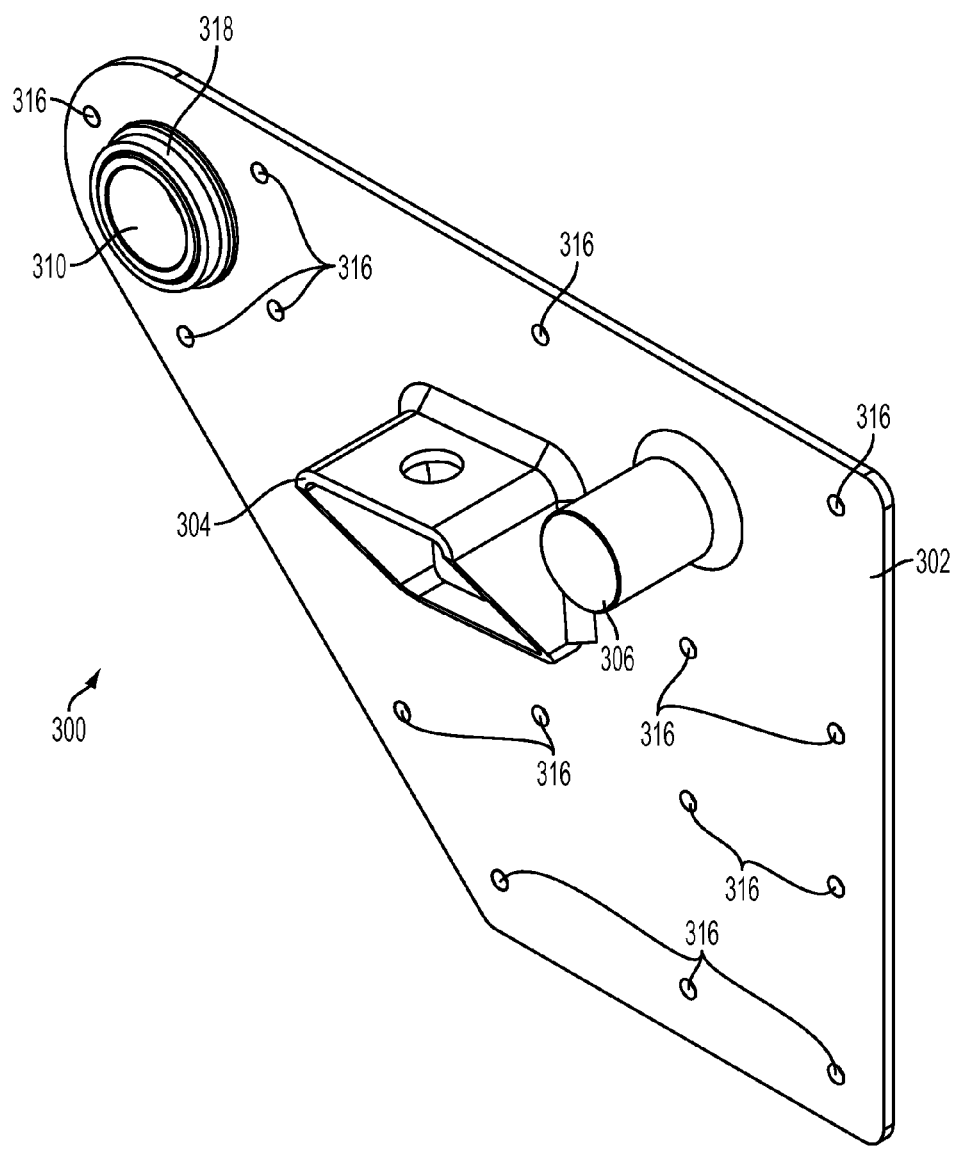
FIG. 2 is a perspective view of a bearing retainer plate for a gangway in accordance with an embodiment of the present invention.
Figure 3:
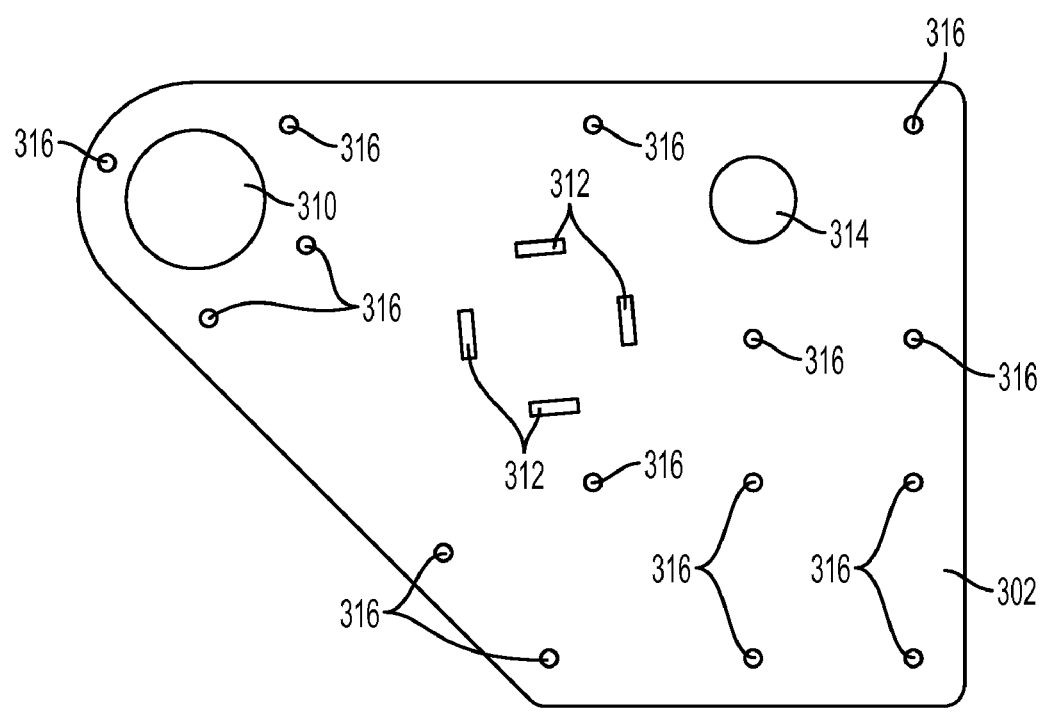
FIG. 3 is a front elevation view of a piece of metal of the bearing retainer plate of FIG. 2.

FIG. 2 is a perspective view a bearing retainer plate 300 in accordance with another embodiment of the present invention. Bearing retainer plate 300 comprises a piece 302 of sheet metal, an over-travel stop bracket 304, and a foot lock stud 306. FIG. 3 is a front elevation view of piece 302 of sheet metal into the configuration illustrated in FIG. 3. Piece 302 is formed by lasering or otherwise cutting a single, continuous piece of sheet metal. Piece 302 is lasered or otherwise cut to define a bearing aperture 310, a plurality of adapter apertures 312, a lock stud aperture 314, and a plurality of rivet apertures 316.

Figure 4:
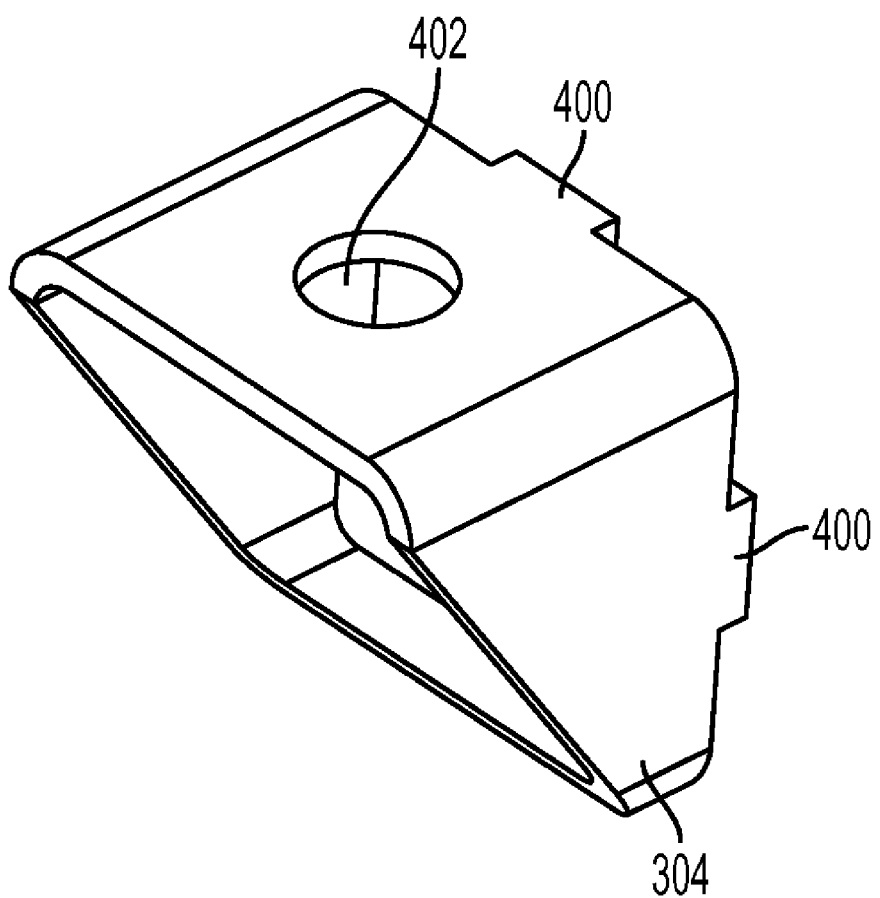
FIG. 4 is a perspective view of an over-travel stop bracket of the bearing retainer plate of FIG. 2.

FIG. 4 is a perspective view of over-travel stop bracket 304, which is formed by lasering or otherwise cutting a single, continuous piece of tubular metal. The bracket is lasered or cut to define a plurality of tab portions 400 and an aperture 402. Each of tabs 400 is configured to be inserted into a corresponding one of adapter apertures 312 (FIG. 3). Once inserted into piece 302 of sheet metal, over-travel stop bracket 304 may then be welded to piece 302 if desired.

Referring to FIGS. 2, 3, and 4, lock stud 306 is preferably formed by lasering or cutting a single, continuous piece of circular, tubular metal and is then inserted into lock stud aperture 314 of piece 302 of sheet metal. Lock stud 306 may then be welded to piece 302. A bearing 318 is inserted into aperture 310. Although it should be understood that any bearing may be used, preferably bearing 318 is a self-centering, self-aligning, and/or self-clinching bearing, such as one provided by SPYRAFLO of Atlanta, Ga.

The lasering, cutting, butterflying, and/or welding described above may be performed by hand, or, in another embodiment, one or more mechanized, programmable machines may be programmed to robotically perform the functions described above. In such an embodiment, for example, piece 302 of sheet metal, over-travel stop bracket 304, and lock stud 306 may be assembled and placed in a working station of a welding robot and then welded by the robot.

Figure 5:
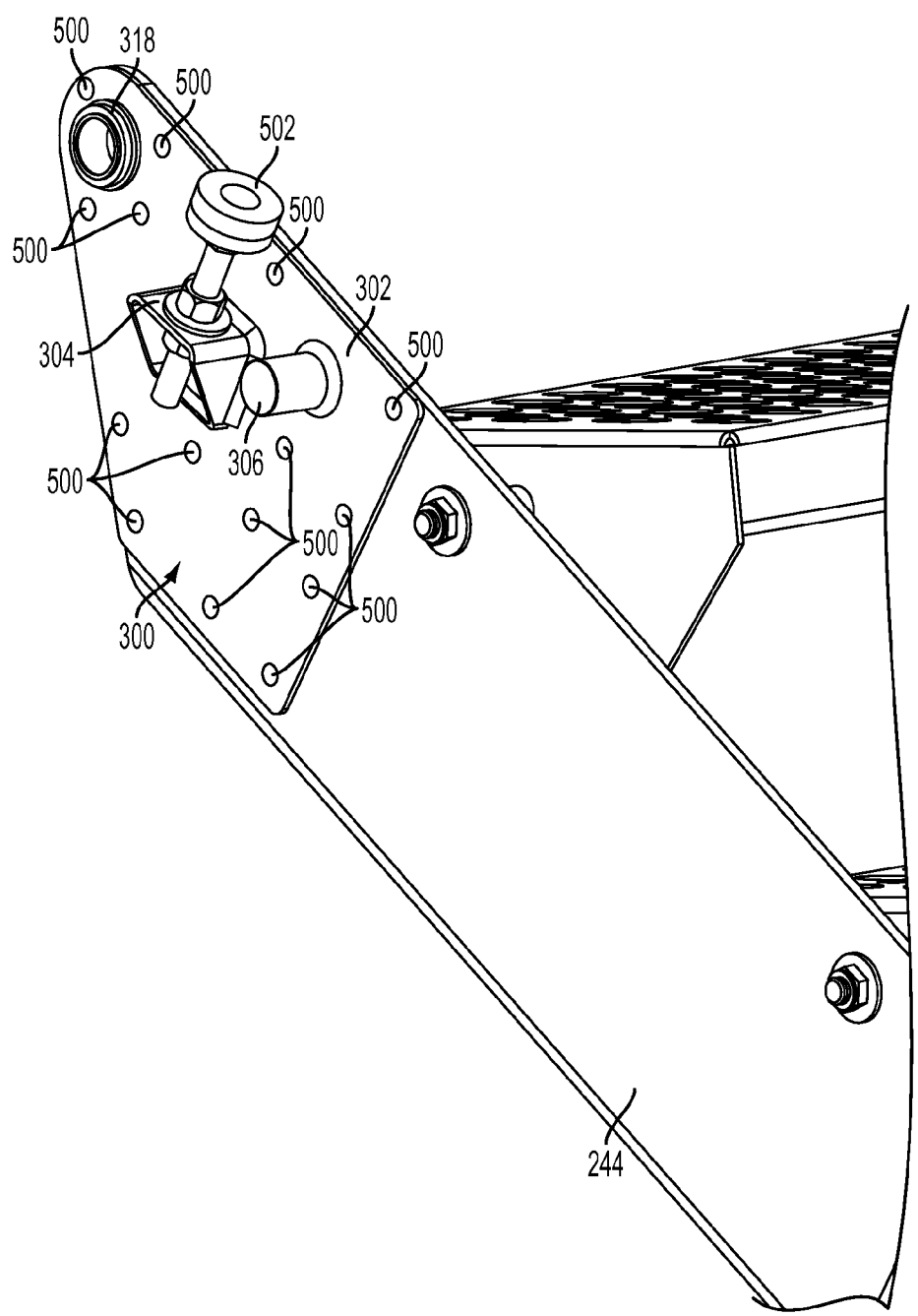
FIG. 5 is a perspective view of the bearing retainer plate of FIG. 2 connected to a portion of a support structure of a gangway in accordance with an embodiment of the present invention.

FIG. 5 illustrates bearing retainer plate 300 connected to a component of a gangway, such as support structure 244 of gangway 240 shown in FIG. 1B. In this embodiment, bearing retainer plate 300 is aligned with support structure 244 so that bearing 318 and bearing aperture 310 (FIG. 2) coaxially align with the aperture of the support structure through which rod 251 passes as described above with respect to FIG. 1B. Rivets 500 are inserted through rivet apertures 316 (FIG. 2) in order to attach bearing retainer plate 300 to support structure 244. Bearing retainer plate 300 may also be welded to support structure 244 if desired. Also in this embodiment, a bumper 502 similar to bumper 274 (FIG. 1B) is inserted into and connected to over-travel stop bracket 304 via a suitable fastener, such as with one or more nuts and a washer. In another embodiment, for instance, a portion of bumper 502 may be threaded to screw into one or more nuts located on the opposite end of the bumper than the one bearing the shock-absorbing material and fastened on opposing sides of bracket 304 with respect to aperture 402 (FIG. 4), as illustrated in FIG. 5.

Figure 6:
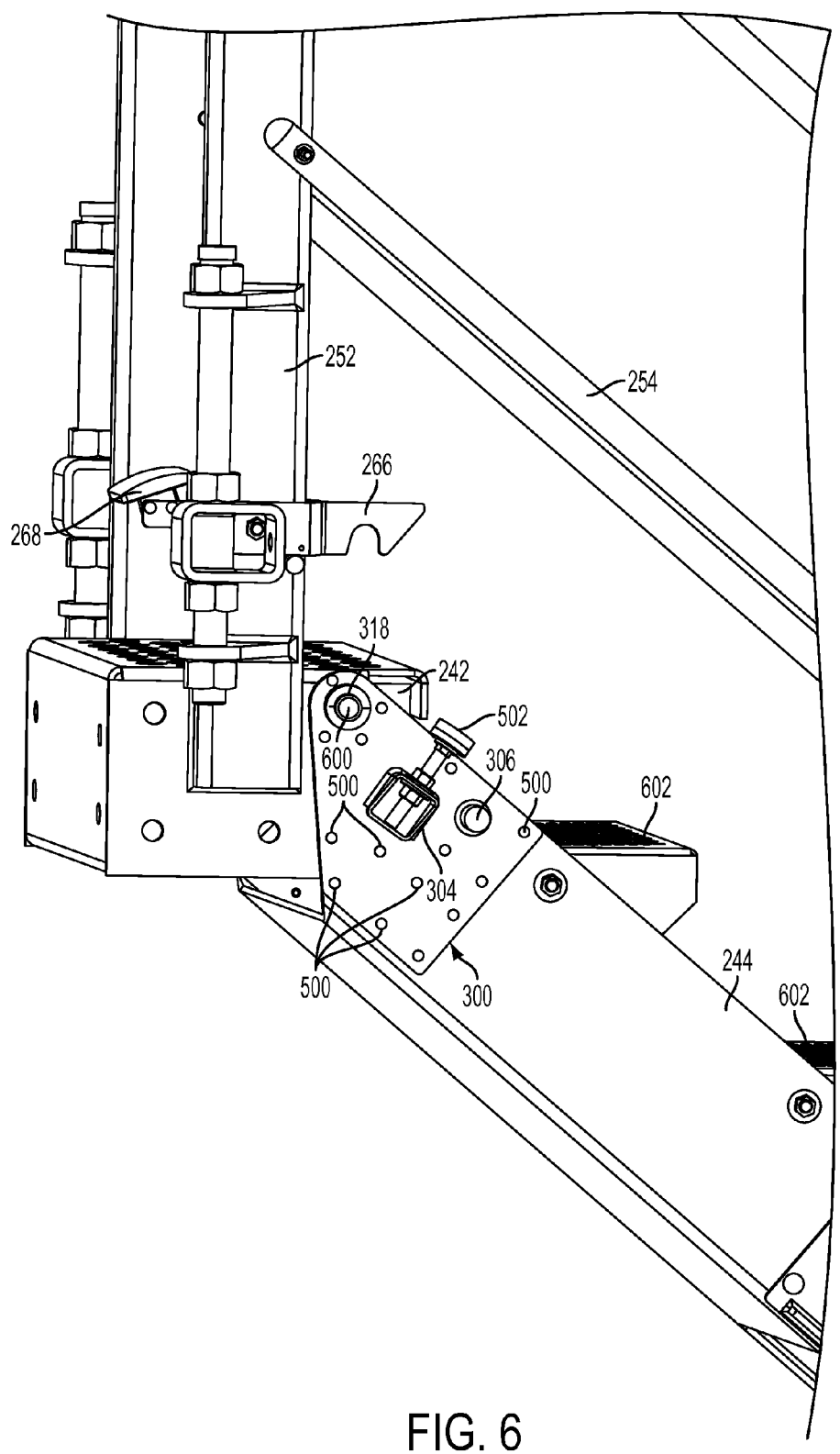
FIG. 6 is a perspective view of the bearing retainer plate and support structure portion of FIG. 5 connected to a portion of a support platform of a gangway in accordance with an embodiment of the present invention.

FIG. 6 illustrates bearing retainer plate 300 and support structure 244 attached to support platform 242 of a gangway. In this embodiment, plate 300 and structure 244 are connected to platform 242 by a rod 600, shaft, or other appropriate member, which passes through bearing 318. As a result, bearing retainer plate 300 and support structure 244 are connected to platform 242 in a manner that allows the bearing retainer plate and support structure to rotate with respect to the support platform. This allows bearing retainer plate 300, support structure 244, and other components of a gangway, such as a plurality of self-leveling steps 602, to rotate with respect to platform 242, in a manner similar to that described above with respect to gangway 240 of FIG. 1B.

It should be understood that, while only one side of support structure 244 is illustrated in FIGS. 5 and 6, a second bearing retainer plate may be attached to a second side of the support structure opposite the side shown if desired. A rod, shaft, or other appropriate member passes through the second bearing retainer plate and the second, opposite side of support structure 244 in order to connect the combination of the two to support platform 242 in a manner that allows the combination to rotate with respect to the platform as described above. Preferably in such an embodiment, the member passing through the second, opposite side of support structure 244 is a continuous piece of tubular metal that comprises rod 600 that passes through bearing retainer plate 300 and the side of support structure 244 illustrated. That is, a single member, such as rod 600, preferably passes through bearings 318 of both bearing retainer plates and both sides of support structure 244, as well as platform 242, should two bearing retainer plates be used.

Those skilled in the art should appreciate that the above description provides a bearing retainer plate made from a single continuous piece of sheet metal that defines a number of apertures. The apertures allow the bearing retainer plate to receive a bearing, a bracket for an over-travel stop, and a foot lock stud and allow the plate to connect to the support structure of a gangway. Those skilled in the art should also appreciate that the construction and arrangement of such a bearing retainer plate increases the strength of the foot lock stud and over-travel stop by dispersing the load of the foot lock stud and over-travel stop over the entire bearing retainer plate. While the increase in the load bearing characteristics provided by the use of such a bearing retainer plate will vary depending on the gangway and support structure to which the plate is attached, the load bearing ability should be greater than two or three hundred pounds of force.

Referring to FIGS. 1A through 6, in operation, a gangway (10 or 240) is positioned adjacent or over a container 12 either by a fixed structure, such as platform 18, or by a mobile access unit, such as that described in U.S. patent application Ser. No. 12/837,480, referenced above. A user depresses pedal 268 in order to raise foot lock 266, thereby releasing a foot lock stud (264 or 306). This allows the gangway's support structure 244 to move/rotate with respect to certain portions of the gangway, such as support platform 242. For instance, releasing the foot lock stud allows steps 602 or ramps 246 and 248 to lower with respect to support platform 242. Specifically, bearings 318 and rod 600 provide the ability for these components to rotate with respect to support platform 242. The user may then access the container via the gangway.

When not in use, the user may retract the extended or lowered portion of the gangway by applying a pulling force to components of the gangway, such as handrails 258 or chains attached to the end of support structure 244 opposite the end pivotally connected to support platform 242. As noted above, bearing 318 and rod 600 allow support structure 244 to rotate upward with respect to support platform 242. This movement may be facilitated by certain components of the gangway, such as, for instance, a pair of counterbalanced springs connected to the gangway. Over-travel stops 270, and, specifically, bumpers (274 or 502), on respective bearing retainer plates 300 on each side of the gangway come into contact with guardrails 252 when the gangway is placed in its retracted and/or resting position. This prevents components of the gangway that are not supposed to come into contact from bumping, knocking, or colliding with one another. The retracting movement described above causes foot lock 266 to raise, lower, and then lock into place around the foot lock stud, in a manner similar to that described above with respect to FIG. 1B. As a result, the gangway may be maintained in a retracted position. Bearing retainer plate 300 helps to disperse the load applied to foot lock stud 306 and over-travel stop 502 while facilitating the movement of the corresponding gangway.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A gangway comprising:
   a support platform;
   a support structure connected to the support platform in a manner that allows the support structure to rotate with respect to the support platform;
   a piece of metal connected to the support platform;
   a bracket configured to receive a stop inserted into at least a first aperture defined by the piece of metal; and
   a foot lock stud inserted into a second aperture defined by the piece of metal.

2. The gangway of claim 1 further comprising a bearing inserted into a third aperture defined by the piece of metal, wherein the support structure defines a pivot aperture and the bearing coaxially aligns with the pivot aperture in a manner that allows the support structure and piece of metal to rotate with respect to the support platform.

3. The gangway of claim 2 wherein a rod is inserted through the pivot aperture, the bearing, and the support platform in order to pivotally connect the piece of metal, the support structure, and the support platform.

4. The gangway of claim 1 further comprising a handrail connected to the platform support, wherein the stop comes into contact with the handrail when the gangway is retracted into a vertical position.

5. The gangway of claim 1 wherein a portion of any load applied to the bracket or foot lock is dispersed to the piece of metal.

6. A bearing retainer plate for a gangway comprising a single, piece of metal defining first and second apertures, wherein the first aperture is configured to receive an over-travel stop and the second aperture is configured to receive a foot lock stud, and a third aperture configured to receive a bearing, wherein the gangway and bearing retainer plate are rotatable between a deployed position and a stored position.

* * * * *